US008338981B2

(12) United States Patent
Biegert

(10) Patent No.: US 8,338,981 B2
(45) Date of Patent: Dec. 25, 2012

(54) COMMUNICATION BETWEEN NETWORK INTERFACE DEVICE AND SUBSCRIBER DEVICES VIA POWER SUPPLY LINES

(75) Inventor: Mark R. Biegert, Maple Grove, MN (US)

(73) Assignee: Calix, Inc., Petaluma, CA (US)

( * ) Notice: Subject to any disclaimer, the term of this patent is extended or adjusted under 35 U.S.C. 154(b) by 26 days.

(21) Appl. No.: 13/026,592

(22) Filed: Feb. 14, 2011

(65) Prior Publication Data

US 2011/0176807 A1 Jul. 21, 2011

Related U.S. Application Data

(62) Division of application No. 11/706,842, filed on Feb. 15, 2007, now Pat. No. 7,923,855.

(60) Provisional application No. 60/774,783, filed on Feb. 17, 2006.

(51) Int. Cl.
*H02J 3/02* (2006.01)

(52) U.S. Cl. ............................ 307/3; 307/1; 307/DIG. 1

(58) Field of Classification Search .................. 307/1, 2, 307/3, DIG. 1
See application file for complete search history.

(56) References Cited

U.S. PATENT DOCUMENTS

| 5,381,554 | A | 1/1995 | Langer et al. |
| 6,577,230 | B1 | 6/2003 | Wendt et al. |
| 7,030,734 | B2 | 4/2006 | Butler et al. |
| 7,082,541 | B2 | 7/2006 | Hammond et al. |
| 7,194,639 | B2 | 3/2007 | Atkinson et al. |
| 7,330,656 | B2 | 2/2008 | Lee et al. |
| 7,359,647 | B1 | 4/2008 | Faria et al. |
| 7,434,249 | B2 | 10/2008 | Park et al. |
| 7,652,390 | B2 | 1/2010 | Vrla et al. |
| 2003/0033548 | A1 | 2/2003 | Kuiawa et al. |
| 2003/0068033 | A1 | 4/2003 | Kiko |
| 2004/0165889 | A1 | 8/2004 | Mahony et al. |
| 2004/0268160 | A1* | 12/2004 | Atkinson et al. .............. 713/300 |

(Continued)

FOREIGN PATENT DOCUMENTS

WO WO2006/071641 A2 7/2006

OTHER PUBLICATIONS

Bates, "Using Home Power Lines to Distribute Advanced IPTV Services in the Home", IP Television Magazine, Mar. 2006, (7 pages). www.iptvmagazine.com.

(Continued)

*Primary Examiner* — Daniel Cavallari
(74) *Attorney, Agent, or Firm* — Shumaker & Sieffert, P.A.

(57) ABSTRACT

The disclosure describes communication of information between a network interface device and subscriber devices over a power line. A UPS unit receives operating power from subscriber premises via a first power line and delivers operating power to the network interface device via a second power line. The network interface device transmits and receives information, such as voice, video and data, to and from the UPS unit via the second power line. The UPS unit receives the information transmitted by the network interface device via the second power line, and transmits the received information to subscriber devices within the premises via the first power line. The UPS unit receives information transmitted by subscriber devices via the first power line, and transmits the received information to the network interface device via the second power line. The first and second power lines each serve as both a power line and a communication medium.

24 Claims, 7 Drawing Sheets

U.S. PATENT DOCUMENTS

| | | | |
|---|---|---|---|
| 2005/0029476 | A1 | 2/2005 | Biester et al. |
| 2005/0071699 | A1 | 3/2005 | Hammond et al. |
| 2005/0144616 | A1 | 6/2005 | Hammond et al. |
| 2005/0249245 | A1 | 11/2005 | Hazani et al. |
| 2006/0029389 | A1 | 2/2006 | Cleary et al. |
| 2006/0034449 | A1 | 2/2006 | Joerger |
| 2006/0082220 | A1 | 4/2006 | Karam et al. |
| 2006/0188090 | A1 | 8/2006 | Paulsen et al. |
| 2006/0188266 | A1 | 8/2006 | Vrla et al. |
| 2006/0192434 | A1 | 8/2006 | Vrla et al. |
| 2006/0215339 | A1 | 9/2006 | Camagna et al. |
| 2006/0215343 | A1 | 9/2006 | Camagna et al. |
| 2006/0269001 | A1* | 11/2006 | Dawson et al. ............ 375/257 |
| 2007/0195823 | A1 | 8/2007 | Biegert |
| 2008/0159744 | A1 | 7/2008 | Soto et al. |
| 2008/0272932 | A1* | 11/2008 | Booker et al. ............ 340/854.9 |
| 2008/0303679 | A1 | 12/2008 | Vrla et al. |
| 2009/0060530 | A1 | 3/2009 | Biegert et al. |
| 2009/0060531 | A1 | 3/2009 | Biegert et al. |

OTHER PUBLICATIONS

Gardner et al., "HomePlug Standard Brings Networking to the HOme", CommsDesign, Dec. 2000, (7 pages). www.commsdesign.com/main/2000/12/0012feat5.htm.

"HomePlug®AV Technology Overview, 2006, InTellon® No New Wires®", Intellon Corporation, 2006, 26002829 Revision 2, (2 pages). www.intellon.com.

"HomePlug Technology Field Test Results: A White Paper", Homeplug Powerline Alliance, 2003, (6 pages).

"HomePlug 1.0 Technology Paper", HomePlug Powerline Alliance, Feb. 2005, (9 pages).

"HomePlug AV White Paper", HomePlug Powerline Alliance, Inc., document version No. HPAVWP-050818, 2005(11 pages).

"No New Wires: Hitting a Winning Triple-Play Home Networking Solution", HomePNA, Nov. 2006, (8 pages).

"NETGEAR Brings Wireless Internet Connectivity Home", NETGEAR, Inc., Customer Testimonial, 2005, (2 pages). www.NETGEAR.com.

Wright, "Riding the Sine Wave", EDN, Nov. 10, 2005, (6 pages).

"White Paper-Solutions for Triple Play Home Networking Play", Power Line Communcations IC for AV Home Networking, DS2, (2 pages), www.ds2.es, available at http://www.ipcf.org/doc/DS2_-_Solutions_For_Triple_Play_Home_Networking.pdf, with last modified date of Feb. 15, 2005.

"IP Cablecom Embedded MTA Primary Line Support," Society of Cable Telecommunications Engineers, ANSI/SCTE 24-14, 2002, (24 pages).

"IP Cablecom Embedded MTA Primary Line Support," Series J: Cable Networks and Transmission of Television, Sound PRogramme and Other Multimedia Signals, ITU-T J.173, Feb. 2002, (24 Pages).

Jugan et al,, "Powering Architectures for New Needs in Telecommunications," Telecommunications Energy Conference, Intelec 95, 1995, pp. 196-202.

D. Kuhn et al "Powering Issues in an Optical Fibre Customer Access Network", Proceedings of the International Telecommunications Energy Conference, 1991, pp. 51-58.

W. Schulz, "Powering FITL for Deutsche Telekom," Telecommunications Energy Conference, 1998, pp. 255-260.

Office action for U.S. Appl. No. 11/706,842, mailed Mar. 4, 2010, 15 pages.

Response to office action for U.S. Appl. No. 11/706,842, filed Jun. 3, 2010, 17 pages.

Final office action for U.S. Appl. No. 11/706,842, mailed Aug. 17, 2010, 12 pages.

Response to final office action for U.S. Appl. No. 11/706,842, filed Nov. 4, 2010, 12 pages.

* cited by examiner

COMMUNICATION BETWEEN NETWORK INTERFACE DEVICE AND SUBSCRIBER DEVICES VIA POWER SUPPLY LINES

This application is a divisional of U.S. application Ser. No. 11/706,842, filed Feb. 15, 2007, which claims the benefit of U.S. provisional application No. 60/774,783, filed Feb. 17, 2006. The entire contents of these applications are incorporated herein by reference.

TECHNICAL FIELD

The invention relates to networking and, more particularly, communication between a network interface device and subscriber devices.

BACKGROUND

Network interface devices permit a subscriber to access a variety of information via a network. A passive optical network (PON), for example, can deliver voice, video and data among multiple network nodes, using a common optical fiber link. Passive optical splitters and combiners enable multiple optical network terminals (ONTs) to share the optical fiber link. Each ONT terminates the optical fiber link for a residential or business subscriber, and is sometimes referred to as a subscriber premises node that delivers Fiber to the Premises (FTTP) services.

An ONT is connected to one or more subscriber devices, such as televisions, set-top boxes, telephones, computers, or network appliances, which ultimately receive the voice, video and data delivered via the PON. In this manner, the ONT can support telephone, television and Internet services. An ONT is an example of a network interface device. Other examples of a network interface device, in different network types, are cable modems and digital subscriber line (DSL) boxes.

Network interface devices in a cable or hybrid network may be connected to power provided by a central office, which commonly utilizes battery and generator back-up power to maintain a continuous power supply. In contrast, an ONT in an all-fiber optical network is ordinarily powered locally at the subscriber premises. An ONT may receive power from an uninterruptible power source (UPS) unit mounted within or outside the subscriber premises.

The UPS unit may provide back up power during a power outage to maintain critical services, such as voice service. The UPS unit obtains AC power from line power within the subscriber premises and generates DC power for use by the ONT. Hence, the UPS unit is coupled to the ONT via a DC power line and to line power within the subscriber premises via an AC power line. The UPS unit also includes a battery to support backup power when AC line power is unavailable.

SUMMARY

In general, the invention is directed to techniques for communication of information between a network interface device and subscriber devices over a power line within the subscriber premises. A UPS unit receives operating power from the subscriber premises via a first power line and delivers operating power to the network interface device via a second power line. The network interface device is configured to transmit and receive information, such as voice, video and data, to and from the UPS unit via the second power line. The UPS unit is configured to receive the information transmitted by the network interface device via the second power line, and transmit the received information to subscriber devices within the premises via the first power line. The UPS unit is also configured to receive information transmitted by subscriber devices via the first power line, and transmit the received information to the network interface device via the second power line. Hence, the first and second power lines each serve as both a power line and a communication medium.

In some embodiments, the first power line extending between the subscriber devices and the UPS unit is an alternating current (AC) power line within the subscriber premises, and the second power line extending between the UPS unit and the network interface device is a direct current (DC) power line. By using the first power line coupled to the UPS unit, the invention permits information to be communicated over existing AC power lines within the subscriber premises, eliminating or reducing the need to install additional wiring within the subscriber premises for communication of network information. In addition, by using the second power line extending between the UPS unit and the network interface device as a communication medium, the invention eliminates the need for installation of an additional communication cable between the network interface device and the subscriber premises. Instead, the DC power line serves as both a power supply line and a communication medium.

Although the invention may be generally applicable to network interface devices in a variety of networks, application of the invention to an ONT in a PON will be described throughout this disclosure for purposes of illustration. A UPS unit may supply power to an optical network terminal (ONT) in a passive optical network (PON), and receive information from the ONT. The UPS unit provides power via a direct current (DC) power line that extends between the UPS unit and the ONT, and receives information from the ONT via the same DC power line. The ONT includes a physical interface for transmitting information, such as Internet Protocol television (IPTV) or other high-speed information, to the UPS unit via the DC power line. In some embodiments, the ONT may transmit the information to the UPS unit by inserting a carrier signal onto the DC power line and modulating the carrier signal to encode information.

The UPS unit includes a physical interface for transmitting and receiving information to and from subscriber devices within the subscriber premises over existing AC power lines within the subscriber premises. The UPS unit may connect to the existing AC power lines via an AC power cord. In some embodiments, the UPS unit may transmit and receive information over existing AC power lines in accordance with power line-based networking techniques or broadband over power line (BPL) techniques. In accordance with the invention, an ONT may transmit and receive information, via the UPS unit, to and from AC power outlets readily available throughout the subscriber premises, providing ubiquitous availability of network information such as voice, video and/or data without the need to install additional wiring at the subscriber premises.

In one embodiment, the invention provides a method comprising supplying power to a network interface device via a direct current (DC) power line that extends between the network interface device and an uninterruptible power supply (UPS) unit, supplying power to the UPS unit via an alternating current (AC) power line that extends from a subscriber premises to the UPS unit, transmitting information to the UPS unit from the network interface device via the DC power line, and transmitting the information from the UPS unit to one or more subscriber devices within the subscriber premises via the AC power line.

In another embodiment, the invention provides an uninterruptible power supply (UPS) unit for a network interface device, the UPS unit comprising a power source, a direct current (DC) power line configured to deliver power from the power source to the network interface device, and an interface configured to receive information from the ONT via the DC power line and transmits the received information to one or more subscriber devices within a subscriber premises over an alternating current (AC) power line.

In an additional embodiment, the invention provides a network interface device comprising circuitry that receives operating power from a direct current (DC) power line that extends between the network interface device and an uninterruptible power supply (UPS) unit, and an interface that transmits information to the UPS unit via the DC power line.

In another embodiment, the invention provides a passive optical network (PON) comprising an optical network terminal (ONT) that receives information, an uninterruptible power supply (UPS) unit that delivers power to the ONT via a direct current (DC) power line that extends between the ONT and the UPS unit, and an alternating current (AC) power line that delivers power to the UPS unit, wherein the ONT is configured to transmit information to the UPS over the DC power line, and wherein the UPS is configured to transmit information to one or more subscriber devices at a subscriber premises over the AC power line.

In an additional embodiment, the invention provides a method comprising supplying power to a network interface device via a first power line that extends between the network interface device and an uninterruptible power supply (UPS) unit, supplying power to the UPS unit via a second power line that extends from a subscriber premises to the UPS unit, transmitting information to the UPS unit from the network interface device via the first power line, and transmitting the information from the UPS unit to one or more subscriber devices within the subscriber premises via the second power line.

In a further embodiment, the invention provides a method comprising supplying power to a network interface device via a direct current (DC) power line that extends between the network interface device and an uninterruptible power supply (UPS) unit, supplying power to the UPS unit via an alternating current (AC) power line that extends from a subscriber premises to the UPS unit, transmitting information to the UPS unit from one or more subscriber devices within the subscriber premises to the network interface device via the AC power line, and transmitting the information from the UPS unit to the network interface device.

The invention may offer one or more advantages, particularly in a PON environment. For example, unlike ONTs that require wiring a subscriber premises with fast Ethernet cable, such as CAT5e, to transmit high speed information to information interfaces within a subscriber premises, the invention permits transmission of information to subscriber devices within a subscriber premises over existing AC power lines. The transmission of information may be bi-directional so that the ONT and subscriber devices may exchange information over DC and AC power lines. In addition, there is no need to provide a dedicated communication cable from the ONT to the subscriber premises. Instead, the ONT transmits information to the subscriber premises via the UPS unit. By eliminating the need for extra cables (other than the DC power line) to penetrate the subscriber premises, the invention may decrease cost as well as installation complexity and time.

In addition, the invention may provide increased availability of information within a subscriber premises compared to ONTs that utilize technologies such as home phone networking alliance (HPNA) or multimedia over coax alliance (MOCA) to transmit information throughout a subscriber premises over existing phone lines or coaxial cables because AC power outlets are spread throughout the subscriber premises more evenly than phone or coaxial outlets. Notably, the National Electric Code (NEC) mandates that AC power outlets must be readily available throughout the premises.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
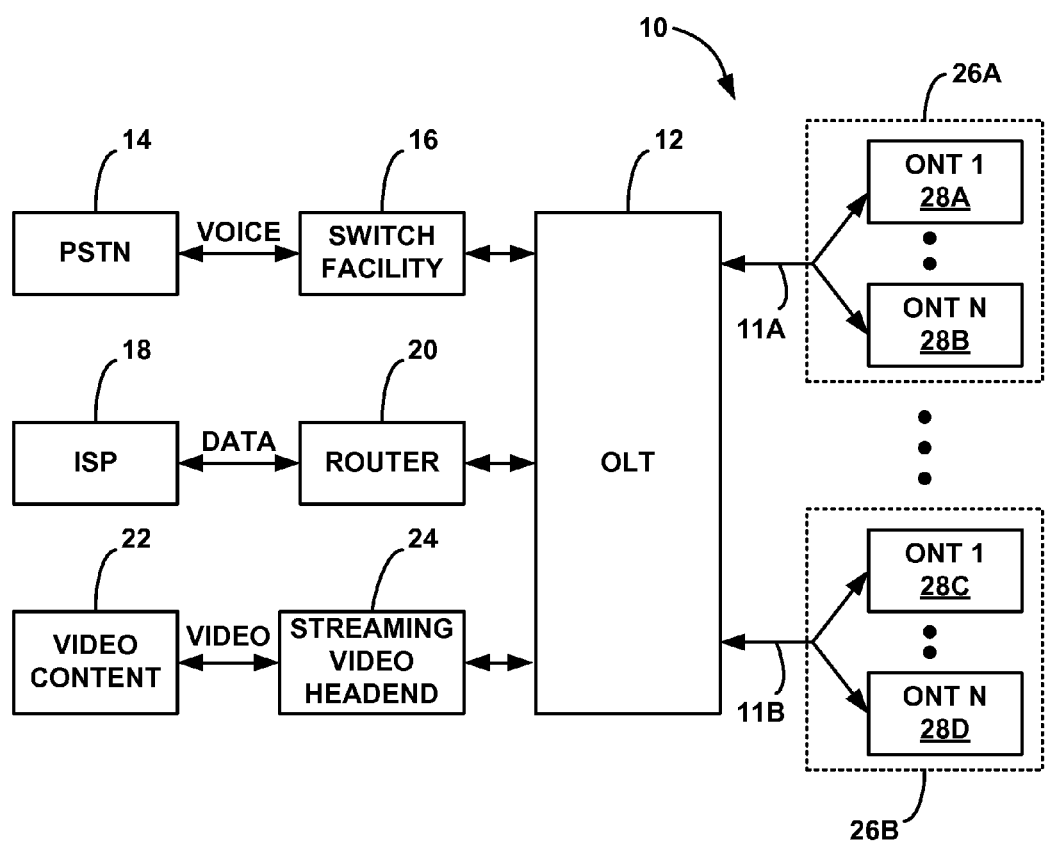
FIG. 1 is a block diagram illustrating an exemplary PON suitable for transmitting information from an ONT to subscriber devices within a subscriber premises over existing power lines at the subscriber premises.

In general, the invention is directed to techniques for communication of information between a network interface device and subscriber devices over a power line within the subscriber premises. A UPS unit receives operating power from the subscriber premises via a first power line and delivers operating power to the network interface device via a second power line. The network interface device is configured to transmit and receive information, such as voice, video and data, to and from the UPS unit via the second power line. The UPS unit is configured to receive the information transmitted by the network interface device via the second power line, and transmit the received information to subscriber devices via the first power line. The UPS unit is also configured to receive information transmitted by subscriber devices via the first power line, and transmit the received information to the network interface device via the second power line. Hence, the first and second power lines each serve as both a power line and a communication medium.

The network interface device receives information such as voice, video and/or data from a network, e.g., via an optical fiber link, and transmits the information to the subscriber devices via the second power line extending between the network interface device and the UPS unit, and then via the first power line extending between the UPS unit and the subscriber devices. Likewise, for bi-directional communication, the subscriber devices transmit information such as voice, video and/or data to the network via the first power line extending between the subscriber devices and the UPS unit, and then via the second power line extending between the UPS unit and the network interface device, which is coupled to the network, e.g., via an optical fiber link. Bi-directional communication of network information will be described herein for purpose of illustration. In some embodiments, however, the invention likewise may be applicable to uni-directional communication of network information, e.g., television data or signals, from the network interface device to the subscriber devices via the UPS unit.

The first power line may be an alternating current (AC) power line within the subscriber premises, and the second power line may be a direct current (DC) power line that extends between the UPS unit and the network interface device. By using the first power line coupled to the UPS unit, the invention permits information to be communicated over existing AC power lines within the subscriber premises, eliminating or reducing the need to install additional wiring within the subscriber premises. In addition, by using the second power line extending between the UPS unit and the network interface device, the invention eliminates the need for installation of an additional communication cable that penetrates the subscriber premises and extends between the network interface device and the subscriber premises.

Although the invention may be generally applicable to network interface devices in a variety of networks, application of the invention to an ONT in a PON will be described throughout this disclosure for purposes of illustration. A UPS unit may supply power to an optical network terminal (ONT) in a passive optical network (PON), receive information from the ONT and subscriber devices connected to the AC power lines within the subscriber premises, and transmit information received from the connected subscriber devices to the ONT and information received from the ONT to the connected subscriber devices. The UPS unit provides power via a direct current (DC) power line that extends between the UPS unit and the ONT, and transmits and receives information to and from the ONT via the same DC power line. The ONT includes a physical interface for transmitting information, such as Internet Protocol television (IPTV) or other high-speed voice, video, and/or data information, to the UPS unit via the DC power line. Voice information may support telephone services, while data may support Internet or other network services. In some embodiments, the ONT may transmit the information to the UPS unit by inserting a carrier signal onto the DC power line and modulating the carrier signal to encode network information.

The UPS unit includes a physical interface for transmitting the information received from the ONT to subscriber devices within the subscriber premises over existing AC power lines within the subscriber premises. The physical interface of the UPS unit also enables the UPS unit to transmit information received from subscriber devices, such as voice information for telephone services or data for Internet services, to the ONT. The interface may be a common interface that handles both transmission and reception of information to and from the network interface device and the subscriber devices, or multiple interfaces that separately handle transmission and reception to and from the network interface device and the subscriber devices. In either case, a single, common interface or a collection of two or more interfaces may be considered an interface for purposes of this disclosure.

Information is exchanged between the UPS unit and the ONT via the DC power line, and information is exchanged between the UPS unit and the subscriber devices via the AC power line, thereby providing bi-directional communication between the ONT and subscriber devices. The UPS unit may connect to the existing AC power lines via an AC power cord. In some embodiments, the UPS unit may transmit information over existing AC power lines in accordance with power line-based networking techniques or broadband over power line (BPL) techniques. An example of a suitable power line-based networking technique is defined by the HomePlug® Powerline Alliance. HomePlug AV (HPAV), for example, has been designed to provide high-quality, multi-stream networking over AC wiring within subscriber premises at rates of 200 megabits per second (Mbps).

Other examples of power line-based networking or BPL techniques include HomePlug BPL, Intellon HomePlug Turbo, offered by Intellon Corp., of Manhasset, N.Y., and DS2 Powerline Communication (PLC), offered by Design of Systems on Silicon (DS2), of Paterna, Spain. HomePlug BPL is defined in the HomePlug Broadband over Powerline specification provided by the Homeplug Powerline Alliance. HomePlug AV is defined in the HomePlug AV specification provided by the Homeplug Powerline Alliance. In accordance with the invention, an ONT transmits information, via the UPS unit, to AC power outlets readily available throughout the subscriber premises, providing ubiquitous availability of network information such as voice, video or data without the need to install additional wiring at the subscriber premises. The ONT also receives information from the subscriber devices via the UPS unit, which couples the information received from the subscriber devices over the AC power line to the DC power line connected between the UPS unit and the ONT.

The UPS unit includes a power supply that provides power to the ONT during a power outage. The power supply includes AC to DC voltage conversion circuitry that converts AC line power from the subscriber premises to DC line power to power the ONT. In addition, the UPS unit includes a physical interface to receive information from the ONT, and transmit the information to one or more subscriber devices within the subscriber premises over existing AC power lines. The physical interface couples the information received from the ONT via the DC power line to the existing AC power line at the subscriber premises. The UPS unit may connect to the existing AC power lines with a typical AC power cord. The physical interface also receives information from subscriber devices and transmits the information to the ONT over the DC power line. In this case, the physical interface couples the information received from the subscriber devices via the AC power line to the DC power connected between the UPS unit and the ONT.

In some embodiments, the physical interface in the UPS unit may include a passive resistor-inductor-capacitor (RLC) coupling network that passively couples the carrier signal received from the ONT to the AC power lines at the subscriber premises and passively couples the carrier signal received from subscriber devices to the DC power line that extends between the UPS unit and the ONT. In other embodiments, the physical interface of the UPS unit may include an active relay agent that converts the information received from the ONT for transmission on the AC power line and, similarly, converts the information received from the subscriber devices for transmission on the DC power line. In some embodiments, the active relay agent may simply repeat the received information. In other embodiments, the active relay agent may convert the received information, e.g., in terms of frequency, pulse width, or coding scheme. In either case, the information transmitted from the UPS unit to AC power outlets via the AC power line or to the ONT via the DC power line is formulated in accordance with a desired power line-based networking technique, such as HomePlug AV. The physical interface may also include circuitry that acts as a router or firewall to provide a layer of security.

The ONT may transmit information to the UPS unit over the DC power line using the same technology or standard used by the UPS unit to transmit information over the AC power lines at the subscriber premises, or using a different technology or standard. If a different standard or technology is used for transmission from the ONT to the UPS unit, the physical interface of the UPS unit may act as a gateway and further include conversion circuitry to convert the signal received from the ONT into a signal suitable to be transmitted over the AC power lines. As an example, the network interface device may transmit information to the UPS unit in accordance with the Intellon Turbo standard, but the UPS unit may transmit information over the AC power lines using the HomePlug AV standard. Thus, the UPS unit converts the received Intellon Turbo signal into a HomePlug AV signal for transmission over the AC power lines. However, in other embodiments, the network interface device and the UPS unit may transmit information over the DC power line and AC power lines, respectively, using the Homeplug AV standard. In this case, the physical interface of the UPS unit may not include conversion circuitry.

Power outlets within a subscriber premises are broadband enabled when transmitting information over AC power lines at a subscriber premises in accordance with power line based home networking standards, such as HomePlug AV. Thus, a modem may be incorporated at any power outlet to connect a subscriber device to the power line-based network. For example, a subscriber may connect a game console in one room using a HomePlug AV modem and power outlet, a set-top box in another room using another HomePlug AV modem and power outlet, and a computer in yet another room using a different HomePlug AV modem and power outlet. Consequently, the invention provides increased access to high speed information without installing additional wires at the subscriber premises. Instead, the existing AC power lines and outlets can be used. Moreover, transmission of the broadband information via the DC power line extending between the ONT and the UPS unit eliminates the need for extra cables, in addition to the power cable, to penetrate the subscriber premises, further decreasing cost as well as installation complexity and time.

FIG. 1 is a block diagram illustrating a passive optical network (PON) 10. Although application of the invention to an ONT powered by a UPS unit in a PON 10 is described herein for purposes of illustration, the invention is not so limited, and may be applicable to network interface devices powered by UPS units in other types of networks, such as cable- or DSL-based networks. Hence, a network interface device may take the form of an ONT, a cable modem or a DSL box.

As shown in FIG. 1, PON 10 can be arranged to deliver voice, information and video content (generally "information") to a number of network nodes via optical fiber links. In exemplary embodiments, PON 10 can be arranged to deliver Internet Protocol television (IPTV) and other high speed information, i.e., information transmitted at approximately 200 Mbps or higher. Exemplary components for implementing a PON are commercially available from Calix Networks, Inc. of Petaluma, Calif., and designated by the tradenames F5 and FD headend bay interfaces, i.e., optical line terminals (OLTs), and the 700 F and 500 F subscriber premises nodes, i.e., optical network terminals (ONTs). The OLT and ONT may conform to any of a variety of PON standards, such as the broadband PON (BPON) standard (ITU G.983) or the giga-bit-capable PON (GPON) standard (ITU G.984), as well as future PON standards under development by the Full Service Access Network (FSAN) Group or other organizations.

An OLT 12 may receive voice information, for example, from the public switched telephone network (PSTN) 14 via a switch facility 16. In addition, OLT 12 may be coupled to one or more Internet service providers (ISP's) 18 via the Internet and a router 20. As further shown in FIG. 1, OLT 12 may receive video content 22 from video content suppliers via a streaming video headend 24. Video also may be provided as packet video over the Internet. In each case, OLT 12 receives the information, and distributes it along optical fiber links 11A and 11B (collectively "fiber links 11") to groups 26A and 26B (collectively "groups 26") of ONTs 28A, 28B, 28C and 28D (collectively "ONTs 28"). Each of groups 26 is coupled to a respective one of optical fiber links 11. OLT 12 may be coupled to any number of fiber links 11. For purposes of illustration, FIG. 1 shows only two fiber links 11A, 11B.

In some embodiments, OLT 12 may distribute information to groups 26 using a combination of fiber optic links 11 and existing power lines. For example, fiber optic links 11 may distribute information to a power distribution point for a group of subscribers, e.g., a neighborhood of homes or a group of businesses. However, from the power distribution point, the information may be distributed over existing power lines to groups 26. In another example, OLT 12 may distribute information to groups 26 exclusively over existing power lines. However, for purposes of illustration, FIG. 1 only depicts fiber optic links 11 but the invention is not so limited, and may include a combination of fiber optic links 11 and power lines or only power lines to distribute information to groups 26.

A single ONT 28 is an example of a network interface device or "NID." Each of ONTs 28 is coupled to a UPS unit (not shown) via a DC power line. A UPS unit provides AC-to-DC voltage conversion from line power within the subscriber's premises and includes a battery for backup power to maintain critical services such as voice communication during a power failure. A UPS unit is connected to line power provided by the subscriber premises with a standard AC power cord. As will be described in detail, a single ONT 28 transmits information to a UPS unit via the DC power line. The UPS unit includes hardware for receiving the information and transmitting the information over AC power lines at the subscriber premises.

In general, ONT 28 transmits information to the UPS unit using a broadband power line (BPL) technology or another power line based home networking technology. The UPS unit may transmit the information received from ONT 28 to connected subscriber devices (not shown) using the same power line based home networking technology used by ONT 28 or may use a different power line based home networking technology. In exemplary embodiments, ONT 28 and the UPS unit supplying power to ONT 28 may both utilize HomePlug AV or a different power line technology capable of transmitting information at high speeds, i.e., approximately 200 Mbps or higher. Consequently, ONT 28 and the UPS unit are configured to transmit information to AC power outlets readily available through the subscriber premises, thereby providing ubiquitous availability of information without installing additional wire or cables at the subscriber premises.

As will be described in detail, ONTs 28 include hardware for bidirectional communication with PON 10 via links 11 and one or more connected subscriber devices (not shown). In general, ONTs 28 deliver information to a plurality of subscriber devices (not shown) over existing power lines at the subscriber premises as described herein. For example, each ONT 28 may serve as a PON access point for one or more computers, network appliances, televisions, game consoles, set-top boxes, wireless devices, or the like, for video and data services. In some embodiments, for example, the invention provides a convenient technique for linking a video access point (VAP) of an ONT to AC power wires within the subscriber premises. In addition, each ONT 28 may be connected to subscriber telephones for delivery of telephone services. Hence, ONT 28 may provide information in the form of video to support television applications, information to support Internet access, and voice to support telephone services. OLT 12 may be located near or far from a group 26 of ONTs 28. However, OLT 12 is typically located in a telecommunication company central office (CO), while ONTs 28 may be located at any of a variety of locations, including residential or business premises.

More specifically, ONT 28 includes hardware for transmitting and receiving information to and from a UPS unit over the DC power line, which also serves as the power line between the UPS unit and the ONT circuitry. By transmitting and receiving information to and from the UPS unit over the DC power line, a dedicated cable is not required from the ONT to the subscriber premises. The UPS unit includes hardware for transmitting the received information from PON 10 to one or more connected subscriber devices (not shown) over the existing AC power lines at the subscriber premises and transmitting information received from the connected subscriber devices (not shown) to one of ONTs 28 over the DC power line that extends between the UPS unit and the ONT. Thus, the subscriber devices may be connected to any power outlet because every power outlet within the subscriber premises is broadband enabled. With a UPS unit utilizing HomePlug AV technology to transmit information over the AC power lines at the subscriber premises, for example, a HomePlug modem may be incorporated at any power outlet to connect a subscriber device to the network.

Figure 2:
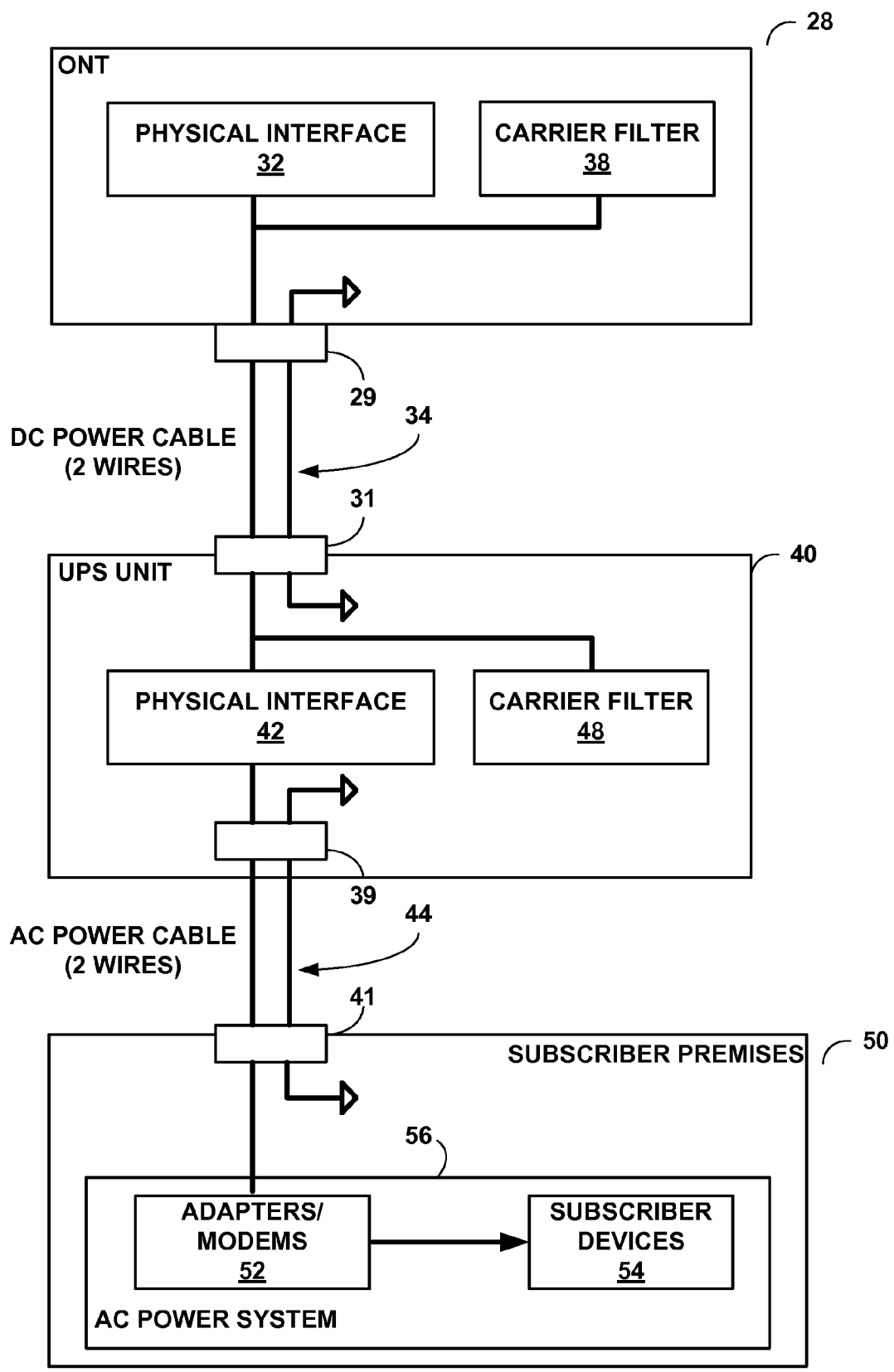
FIG. 2 is a block diagram illustrating a UPS unit that provides power to and exchanges information with an ONT via a common power line and exchanges information to subscriber devices over existing power lines within the subscriber premises.

FIG. 2 is a block diagram illustrating an example ONT 28 and UPS unit 40 configured to transmit and receive information to and from subscriber premises 50 and, more particularly, connected subscriber devices 54 in accordance with an embodiment of the invention. ONT 28 transmits information to and receives information from UPS unit 40 via DC power line 34 which includes two wires (power and ground) and is coupled to terminals 29 and 31. Similarly, UPS unit 40 transmits information to and receives information from subscriber premises via AC power line 44 which also includes two wires (power and ground) and is coupled to terminals 39 and 41. As a result, the invention enables bi-directional communication between ONT 28 and subscriber devices 54 via UPS unit 40 without installing additional wires or cables dedicated to broadband communication. Instead, bi-directional broadband communication is provided via DC power cable 34 and AC power cable 44. FIG. 2 represents the physical layer communication between ONT 28, UPS unit 40, and subscriber premises 50.

In the example of FIG. 2, ONT 28 includes a physical interface 32 and a carrier filter 38. UPS unit 40 includes physical interface 42 and carrier filter 48. Subscriber premises 50 includes line adapters or modems 52 and subscriber devices 54 that receive power from and communicate over AC power system 56. For purposes of illustration, the arrangement shown in FIG. 2 may be configured for simplex communication from ONT 28 to subscriber devices 54 at subscriber premises 50. This arrangement may be suitable for broadcast applications such as IPTV. However, the arrangement shown in FIG. 2 may generally be configured for half duplex or full duplex communication between ONT 28 and subscriber devices 54 at subscriber premises 50.

Generally, ONT 28 may conform to any of a variety of PON standards, such as the BPON standard (ITU G983), the GPON standard (ITU G984), or other standards. The transmit side of ONT physical interface 32 receives information from ONT processing circuitry and modulates a carrier signal based on the received information. Physical interface 32 inserts the modulated carrier signal onto DC power cable 34 for transmission to UPS unit 40. Physical interface 32 may modulate the carrier signal using a power line technology that applies orthogonal frequency-division modulation (OFDM) to the signal carrier to encode information on several distinct carriers. As an example, physical interface 32 may utilize a home power line networking technology such as HomePlug BPL, HomePlug AV, Intellon Turbo, or DS2. Both BPL and home power line networking technologies rely on OFDM technology similar to that used by digital subscriber line (DSL) and some 802.11 wireless local area networks (LANs). With respect to modulating the carrier signal using a HomePlug technology, 84 equally spaced OFDM subcarriers are used in the band between 4.5 and 21 MHz. The signal modulated by physical interface 32 is AC coupled to DC power line 34 via coupling circuitry within physical interface 32. Carrier filters 38 and 48 may be provided at each end of DC power line 34 to keep the output impedance of ONT 28 and the input impedance of UPS unit 40 from loading down the modulated signal.

UPS physical interface 42 receives the modulated signal on DC power line 34 and transmits it to subscriber devices 54 at subscriber premises 50 via AC power line 44. In exemplary embodiments, information is transmitted from ONT 28 to UPS unit 40 and from UPS unit 40 to subscriber premises 50 using a single format or protocol. In such embodiments, physical interface 42 couples the high speed information signal from the DC side of the UPS to the AC side. Physical interface 42 may include, for example, a passive RLC coupling network that couples the received signal to AC power line 44 or an active relay agent that reads and repeats the signal on AC power line 44.

However, in alternative embodiments, UPS unit 40 may transmit information to subscriber premises 50 using a different format than the format used to transmit information from ONT 28 to UPS unit 40. For example, ONT 28 may transmit information to UPS unit 40 using HomePlug BPL and UPS unit 40 may transmit information received from ONT 28 to subscriber premises 50 using HomePlug AV. In this case, UPS unit 40 may include circuitry to convert the received HomePlug BPL signal into a HomePlug AV signal. In this example, UPS unit 40 acts as a gateway between ONT 28 and subscriber premises 50, thereby enabling ONT 28 and subscriber devices 54 to communicate using different technologies or protocols.

The modulated signal produced by physical interface 42 is transmitted to subscriber premises 50 over the power and ground connections of AC power line 44. At subscriber premises 50, the modulated signal is available at every power outlet on AC power system 56. Accordingly, subscriber devices 54 may be connected to any power outlet on AC power system 56 either directly or via adapters or modems 52 to access the modulated signal. Subscriber devices 54 may include, for example, computers, network appliances, televisions, set-top boxes, wireless devices, or other devices for video and data services. In addition, subscriber devices 54 may include telephones. Hence, modems 52 demodulate the modulated signal to provide information in the form of video to support television applications, information to support Internet access, and voice to support telephone services.

During full duplex communication, subscriber devices 54 may transmit voice and data information to ONT 28 via UPS unit 40 over AC power cable 44 and DC power cable 34. In particular, modems 52 receive information from subscriber devices 54 and modulate a carrier signal based on the received information. Modems 52 insert the modulated carrier signal onto AC power cable 44 for transmission to UPS unit 40. UPS unit 40 receives the carrier signal and transmits it to ONT 28 over DC power cable 34. When utilizing a different power line technology to transmit the carrier signal to ONT 28, physical interface 32 converts the signal into the appropriate format and subsequently inserts the modulated carrier signal onto DC power cable 34 for transmission to ONT 28. In this manner, ONT 28 and subscriber devices 54 transmit and receive information to and from each other without requiring additional broadband communication wires or cables to be installed.

Figure 3:
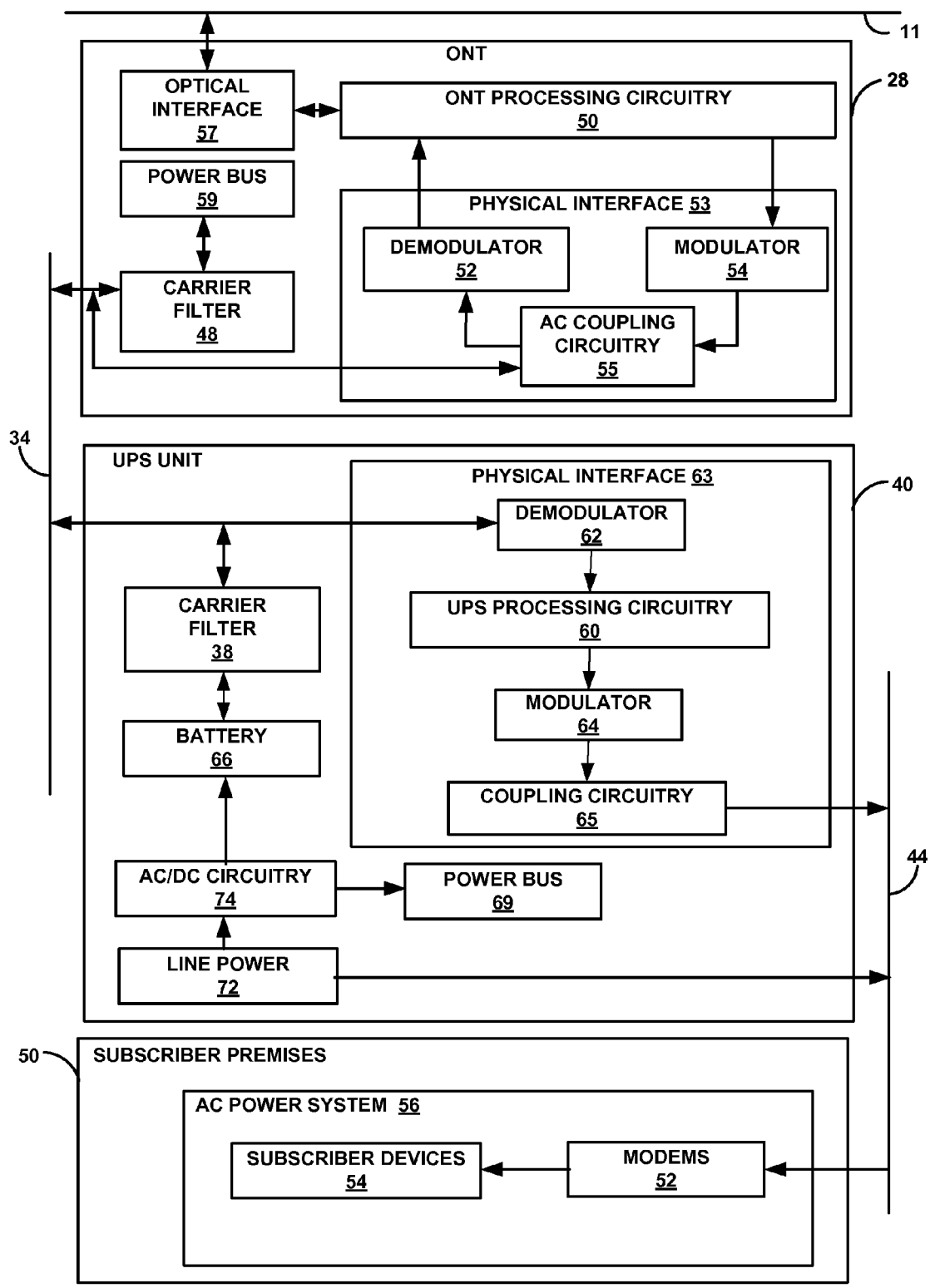
FIG. 3 is a block diagram illustrating the ONT and UPS unit of FIG. 2 in greater detail.

FIG. 3 is a block diagram illustrating an exemplary ONT 28 that transmits and receives information to and from subscriber devices 54 via UPS unit 40. UPS unit 40 supplies power to ONT 28 via DC power line 34 and is connected to AC power system 56 at subscriber premises 50 via AC power line 44. DC power line 34 delivers line power to ONT 28 during normal operation and delivers battery power to ONT 28 during a power failure via power line 34. A power bus 59 within ONT 28 receives power from power line 34 for distribution to various electronic components within ONT 28. UPS unit 40 includes a battery 66 for use in the event of power failure. ONT 28 also transmits information to and receives information from UPS unit 40 via DC power line 34. UPS unit 40 transmits information received from ONT 28 to subscriber devices 54 at subscriber premises 50 and receives power from AC power system 56 via AC power line 44. During duplex communication, modems 52 also transmit information received from subscriber devices 54 to UPS unit 40 via AC power line 44. Because information is transmitted between ONT 28 and subscriber premises 50 over DC power line 34 and AC power line 44, it is possible, in some embodiments, that no other lines, cables, or wires need to be provided to penetrate subscriber premises 50.

In general, ONT 28 provides an interface between optical fiber link 11 on PON 10 and connected subscriber devices 54 in a fiber-to-the-premises (FTTP) network. ONT 28 includes optical interface 57 for receiving information in the form of voice, video, and data from PON 10 over optical fiber link 11 from OLT 12 (not shown in FIG. 3). OLT 12 (not shown) generally handles reception and transmission of information in the form of frames, packets, or other units of information over PON 10. ONT processing circuitry 50 processes received voice, video, and data information to deliver telephone, television, and Internet services, i.e., voice, video, and data, to subscriber devices 54. In addition, ONT processing circuitry 50 and optical interface 57 enable ONT 28 to transmit voice and data information upstream to OLT 12 over optical fiber link 11. Hence, power line 34 may be used for bi-directional communication between ONT 28 and subscriber devices 54 via UPS unit 40. Alternatively, for specific applications, such as IPTV, power line 34 may be used for one-way communication from ONT 28 to subscriber devices 54 via UPS unit 40.

ONT processing circuitry 50 or other circuitry described herein may be implemented as a combination of one or more processors, including one or more microprocessors, digital signal processors (DSPs), application specific integrated circuits (ASICs), field-programmable gate arrays (FPGAs), or other equivalent integrated or discrete logic circuitry. In addition, optical interface 57 may comprise an optical receiver that converts optical signals received from optical fiber link 11 into electrical signals and an optical transmitter that receives electrical signals from OLT 12 (not shown) and ONT processing circuitry 50 and converts the electrical signals to optical signals for transmission over PON 10 via optical fiber link 11. Optical interface 57 may be formed by conventional opto-electrical conversion hardware.

ONT 28 is powered locally at the subscriber premises by DC power line 34, which extends between UPS unit 40 and ONT 28. Again, DC power line 34 may comprise a DC power conductor and a ground conductor, e.g., as shown in FIG. 2. UPS unit 40 includes AC/DC conversion circuitry 74 to provide AC-to-DC voltage conversion from line power 72 (e.g., 110 volt, 60 Hz in North America) provided by AC power system 56 via power line 44 at subscriber premises 50 to produce DC power for transmission over DC power line 34. UPS unit 40 also includes battery 66 for backup power during a power failure to maintain critical services, such as voice service.

A power bus 69 within UPS unit 40 receives power from AC/DC conversion circuitry 74 for distribution of power to various electronic components within the UPS unit. AC/DC circuitry 74 may further include battery charging circuitry that converts AC line power to DC electrical battery charging current to maintain an adequate charge level on battery 66. When line power 72 is unavailable, e.g., due to a line power failure, DC power provided by battery 66 is used to power ONT 28 via power line 48. In some embodiments, ONT 28 also may include a battery, in addition to the battery 66 in UPS unit 40.

In addition to receiving power from UPS unit 40 via DC power line 34, ONT 28 transmits information to UPS unit 40 via DC power line 34. In order to support transmitting information to UPS unit 40 over DC power line 34, additional circuitry may be added to conventional UPS units and ONTs. In particular, ONT 28 may include physical interface 53 and UPS unit 40 may include physical interface 63. In accordance with FIG. 2, carrier filters 38 and 48 may be provided at each end of DC power line 34 to keep the output impedance of ONT 28 and the input impedance of UPS unit 40 from loading down the modulated signal. Physical interface 53 includes demodulator 52, modulator 54, and coupling circuitry 55. To transmit information to UPS unit 40, physical interface 53 inserts a carrier frequency onto the power conductor of DC power line 34. Specifically, modulator 54 converts the output information generated by ONT processing circuitry 50 into an AC signal that is coupled onto DC power line 34 by coupling circuitry 55. The output information generated by ONT processing circuitry 50 may include voice, video, and data information as previously described.

In exemplary embodiments, modulator 54 utilizes a BPL technology or a home power line networking technology to modulate a carrier frequency to encode the output information generated by ONT processing circuitry 50. For example, modulator 54 may modulate the carrier frequency in accordance with HomePlug BPL, HomePlug AV, Intellon Turbo, DS2, or other technologies for transmitting high speed information over power lines.

UPS unit 40 receives the signal modulated by physical interface 53 and transmits the information carried by the modulated signal to subscriber devices 54 over AC power line 44. In this manner, UPS unit 40 acts as a gateway between ONT 28 and subscriber devices 54 and, in some embodiments, may add an additional layer of security. In exemplary embodiments, UPS unit 40 utilizes the same technology or protocol that ONT 28 uses to transmit information to subscriber devices 54. In such embodiments, UPS unit 40 repeats the modulated signal received from ONT 28 over AC power line 44. More specifically, coupling circuitry 65 may comprise an active relay agent that receives and repeats the signal over AC power line 44.

In alternative embodiments, UPS unit 40 transmits information to subscriber devices 54 using a different technology than is used by ONT 28 to transmit the information to UPS unit 40. When UPS unit 40 transmits the information using a different technology, UPS unit 40 demodulates the modulated signal to recover the information, converts the information into a format compliant with the different technology, and transmits the information to subscriber devices 54 over AC power line 44 in accordance with the different technology. In additional embodiments, UPS unit 40 may also provide security features for preventing subscribers at a subscriber premises sharing ONT 28 from intercepting sensitive information.

Physical interface 63 includes demodulator 62, UPS processing circuitry 60, modulator 64, and coupling circuitry 65. Demodulator 62 receives the output of carrier filter 48 and demodulates the signal carrier. UPS processing circuitry 60 processes the output of demodulator 62 to convert information received from ONT 28 into a format that UPS unit 40 can transmit to subscriber devices 54 over AC power line 44. Hence, UPS processing circuitry 60 may not be required in implementations in which ONT 28 and UPS unit 40 transmit information use the same protocol or technology. Instead, in such embodiments, coupling circuitry 65 receives the modulated carrier signal and couples it to AC power line 44. However, when ONT 28 and UPS unit 40 transmit information using different power line technologies, modulator 64 converts the output of UPS processing circuitry 60 into a carrier signal that is AC coupled onto AC power line by coupling circuitry 65. Coupling circuitry 65 may comprise a passive RLC coupling network that passively couples the modulated signal on DC power line 34 or an active relay agent that repeats the modulated signal over AC power line 44. Reciprocal coupling circuitry or a reciprocal relay agent may be provided to convert a modulated signal on AC power line 44 for transmission to ONT 28 over DC power line 34.

In general, modulator 64 modulates the output of UPS processing circuitry 60 to encode information using a home power line networking technology. In exemplary embodiments, modulator 64 may modulate information using HomePlug AV technology. In alternative embodiments, modulator 64 may modulate information using Intellon Turbo, DS2, or other home power line networking technology capable of transmitting high speed information. Communication according to the HomePlug AV technology may permit information to be transmitted at approximately 200 megabits per second (Mbps) or higher. In any case, the modulated signal produced by physical interface 63 is transmitted to subscriber premises 50 over AC power line 44.

AC power line 44 may generally comprise a standard AC power cord that connects to the AC power system 56 at subscriber premises 50. AC power system 56 receives power from line power 72 for distribution to various electronic components within subscriber premises 50. Typically, AC power system 56 comprises copper wires that distribute power to every power outlet within subscriber premises 50. However, because UPS unit 40 transmits the modulated signal over AC power line 44, the modulated signal is available at every power outlet on AC power system. Consequently, subscriber devices 54 may access the modulated signal when connected to any power outlets. In particular, each of subscriber devices 54 connects to AC power system 56 via a corresponding one of modems 52.

Again, subscriber devices 54 may include, for example, computers, network appliances, televisions, game consoles, set-top boxes, wireless devices, or other devices for video and data services. In addition, subscriber devices 54 may include telephones. Hence, modems 52 demodulate the modulated signal to provide information in the form of video to support television applications, information to support Internet access, and voice to support telephone services. Consequently, a subscriber may, for example, connect a game console in one room using a HomePlug modem, a set-top box in another room using another HomePlug modem, and a computer in yet another room using a different HomePlug modem.

As previously described, the invention may provide bidirectional communication between ONT 28 and subscriber devices 54. For example, subscriber devices 54 may transmit data and voice information to ONT 28 to support Internet access and telephone services, respectively. In this case, modems 52 receive information from subscriber devices 54 and modulate a carrier signal based on the received information. Modems 52 insert the modulated carrier signal onto AC power cable 44 for transmission to UPS unit 40. When UPS unit 40 communicates with ONT 28 and subscriber devices using a different technology, UPS unit 40 demodulates the received signal and UPS processing circuitry 60 converts the demodulated signal into the appropriate format. Modulator 64 then modulates the signal and coupling circuitry 65 couples the signal onto DC power 34. In contrast, when UPS unit 40 communicates with ONT 28 and subscriber devices 54 using the same technology, the coupling circuitry 65 may couple the received signal to DC power 34 without processing the signal.

Figure 4:
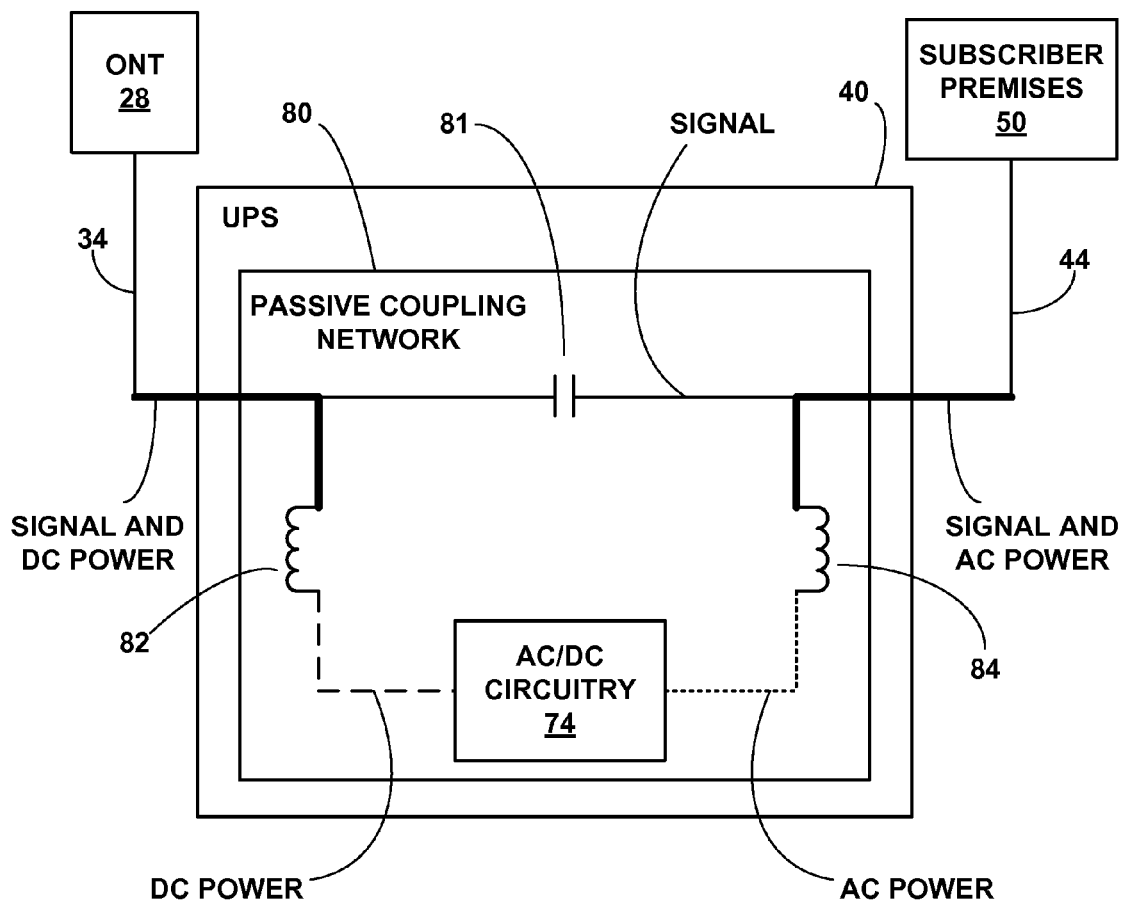
FIG. 4 is a block diagram illustrating components of the UPS unit of FIG. 2 in accordance with an embodiment of the invention.

FIG. 4 is a circuit diagram illustrating an exemplary passive RLC coupling network 80 that couples a high speed information signal between DC power line 34 and AC power line 44. Coupling network 80 includes coupling capacitor 81 and inductive blocking coils 82 and 84. In general, coupling network 80 may be located internal to UPS unit 40 as shown or, alternatively, external to UPS unit 40. In any case, coupling network 80 enables a carrier signal transmitted by ONT 28 or subscriber devices 54 within subscriber premises 50 to pass between DC power line 34 and AC power line 44.

As previously described, UPS unit 40 obtains AC power from subscriber premises 50 and generates DC power for use by ONT 28 during normal operating conditions. In particular, UPS unit 40 is coupled to ONT 28 via DC power line 34 and to AC power system 56 at subscriber premises 50 via AC power line 44. UPS unit 40 may include AC/DC circuitry 74 to provide AC-to-DC voltage conversion from power (e.g., 110 volt, 60 Hz in North America, or other voltage and frequencies in other regions) provided by subscriber premises 50 to produce DC power for transmission over DC power line 34.

Further, ONT 28 may transmit information to subscriber premises 50 via UPS unit 40 by inserting a modulated carrier signal on DC power line 34. Similarly, subscriber devices 54 within subscriber premises 50 may transmit information to ONT 28 via UPS unit 40 by inserting a modulated carrier signal on DC power line 34. Coupling network 80 passively couples the carrier signal between DC power line 34 and AC power line 44 to enable simplex or duplex communication. As previously described, ONT 28 and subscriber devices 54 may transmit carrier signals using a power line networking technology such as HomePlug BPL, HomePlug AV, Intellon Turbo, or DS2. In some embodiments, ONT 28 and subscriber devices 54 may transmit carrier signals to each other using a single format or protocol. In such embodiments, the configuration of coupling network 80 may be appropriate. However, in alternative embodiments, ONT 28 and UPS unit 40 may transmit carrier signals between each other using a different format, e.g., HomePlug BPL, than the format used to transmit carrier signals between UPS unit 40 and subscriber devices 54, e.g., HomePlug AV. In such embodiments, UPS unit 40 may include additional circuitry to convert the received HomePlug BPL signal into a HomePlug AV signal. The additional circuitry may be integrated with coupling network 80 and, more particularly, with coupling capacitor 81. In the illustrated example of FIG. 4, ONT 28 and subscriber devices 54 transmit carrier signals using the same format.

Accordingly, capacitor 81 is inserted in series with DC power line 34 and AC power line 44 to couple the carrier signal between DC power line 34 and AC power line 44. Blocking coils 82 and 84 may be inserted in series with each other and AC/DC circuitry 74 and in parallel with capacitor 81. Because the carrier signal may be transmitted at a substantially higher frequency, e.g., 4.5-21 MHz, than the 60 Hz AC power waveform and DC power waveform, capacitor 81 acts as a high pass filter that provides a low impedance path for the carrier signal. In addition, blocking coils 82 and 84 are the dual of capacitor 81. In other words, the impedance of blocking coils 82 and 84 increases in proportion to increasing frequency while the impedance of capacitor 81 decreases in proportion to increasing frequency. Thus, blocking coils 82 and 84 may appear as a low impedance path to AC and DC power waveforms while preventing capacitor 81 from attenuating the carrier signal. In order to emphasize the operation of coupling network 80, the paths carrying both signal and power (AC or DC power) are illustrated with bold lines, the path carrying only the carrier signal is illustrated as a standard line, the path carrying DC power is illustrated as a dashed line, and the path carrying AC power is illustrated with a dotted line.

Figure 5:
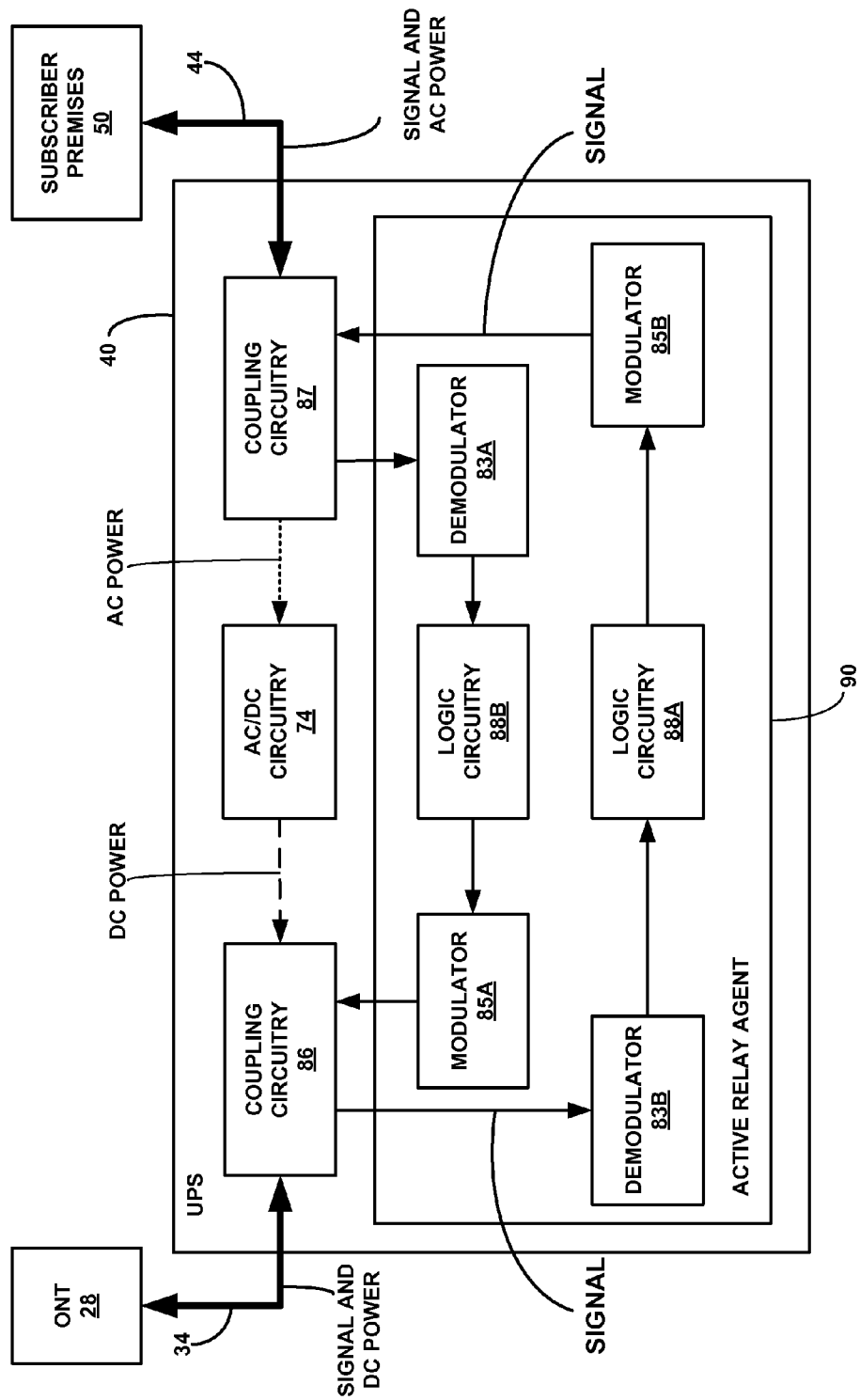
FIG. 5 is a block diagram illustrating components of the UPS unit in accordance with another embodiment of the invention.

FIG. 5 is a schematic diagram illustrating an exemplary active relay agent 90 that reads and repeats the high speed information signal between DC power line 34 and AC power line 44. Active relay agent 90 may be an alternative to the passive RLC coupling network 80 of FIG. 4. Active relay agent includes modulators 85A and 85B, demodulators 83A and 83B, and logic circuitry 88A and 88B. In contrast to coupling network 80 of FIG. 4, which enables a carrier signal to "pass through" UPS unit 40 between DC power line 34 and AC power line 44, relay agent 90 receives a carrier signal on DC power line 34 or AC power line 44 and re-transmits the signal on AC power line 44 or DC power line 34, respectively, outputting the carrier signal with more strength than was received.

For example, relay agent 90 may receive a carrier signal transmitted by ONT 28 via DC power line 34. Relay agent 90 may re-transmit the received signal, i.e., recreate an amplified copy of the received signal and transmit the amplified signal over AC power line 44. As an example, in some embodiments, relay agent 90 may operate by receiving a first frame of data from ONT 28 and re-transmitting the first frame when it receives the second frame of data from ONT 28. For carrier signals transmitted by subscriber devices 54 at subscriber premises 50, relay agent 90 may receive the carrier signal via AC power line 4 and re-transmit the received signal with increased signal strength over DC power line 34. Consequently, relay agent 90 may be preferred over coupling network 80 when implemented with a subscriber premises 50 having a distribution system with a low high frequency impedance.

The overall high frequency impedance of the distribution system is dependent on the overall size of the subscriber premises and the number of high impedance devices, such as home theater systems, computers, and other electronic devices. The wiring in a distribution system inherently has impedance and, thus, as the amount of wiring increases, the impedance decreases. In addition, as the number of electronic devices increases, the number of "leaks" increases thereby decreasing the impedance. As a result, relay agent 90 may be particularly advantageous when implemented with a subscriber premises 50 that has a distribution system covering a large area, includes a large number of electronic devices, or both.

With respect to FIG. 5, the paths, i.e., wires or cables, that carry both signal and power (AC power or DC power) are illustrated with bold lines, the paths carrying only the carrier signal are illustrated as standard lines, the paths carrying DC power are illustrated as a dashed line, and the paths carrying AC power are illustrated with a dotted line. In some embodiments, physical interface 63 of FIG. 3 may comprise relay agent 90. In such embodiments, coupling circuitry 86 and 87 may comprise coupling circuitry 65 of FIG. 3, demodulators 83A and 83B may comprise demodulator 62, and modulators 85A and 85B may comprise modulator 64.

During operation, UPS unit 40 obtains AC power from subscriber premises 50 and generates DC power for use by ONT 28. AC/DC circuitry 74 provides AC-to-DC voltage conversion from power (e.g., 110 volts, 60 Hz in North America) provided by subscriber premises 50 to produce DC power for transmission over DC power line 34. In addition, ONT 28 may transmit information to subscriber devices 54 at subscriber premises 50 by inserting a modulated carrier signal on DC power line 34. Similarly, subscriber devices 54 may transmit information to ONT 28 via UPS unit by inserting a modulated carrier signal on DC power line 34. Coupling circuitry 86 and 87 each act as a high pass filter that provides a low impedance path for the carrier signal to logic circuitry 88A and 88B, respectively, while enabling AC and DC power waveforms to propagate over AC power line 44 and DC power line 34, respectively. In addition, coupling circuitry 86 and 87 couple the carrier signal output by modulators 65A and 65B to DC power line 34 and AC power line 44, respectively.

The operation of relay agent 90 is described by way of example herein. In operation, ONT 28 transmits a carrier signal over DC power line 34. Coupling circuitry 86 acts as a high pass filter providing a low impedance path for the high frequency carrier signal to demodulator 83B. Demodulator 83B outputs the demodulated signal to logic circuitry 88A. In this example, logic circuitry 88A may include UPS processing circuitry 60 of FIG. 3 and circuitry for re-transmitting the signal as previously described. Thus, in embodiments in which UPS unit 40 transmits information to subscriber devices 54 using a different home networking power line technology than is used by ONT 28 to transmit the information to UPS unit, logic circuitry 88A may process the output of demodulator 83B to convert information received from ONT 28 into a format compliant with the different technology and outputs a signal with an amplified signal strength, e.g., a signal strength large enough so that the signal received by subscriber devices 54 enables reliable operation. However, in embodiments in which ONT 28 and subscriber devices transmit information using the same technology or format, logic circuitry 88A may not convert the received information. Rather logic circuitry 88A may repeat the signal, e.g., output a signal with an amplified signal strength at the same time the next signal is received from demodulator 83B. In any case, modulator 85B modulates the output of logic circuitry 88A to encode information using a home power line networking technology. Coupling circuitry 87 couples the modulated carrier signal to AC power 44. Consequently, the modulated signal is available at every power outlet on AC power system 56.

Relay agent 90 operates in a similar manner for transmitting carrier signals from subscriber devices 54 at subscriber premises 50 to ONT 28. In particular, coupling circuitry 87 acts as a high pass filter, provides a carrier signal transmitted to UPS unit 40 via AC power line 44, and provides a low impedance path to demodulator 83A. Demodulator 83A outputs a demodulated signal to logic circuitry 88B which re-transmits the received signal with amplified signal strength. If subscriber devices 54 and ONT 28 transmit information using the same home networking power line technology, logic circuitry 88B may re-transmit the signal as previously described. However, if the ONT 28 and subscriber devices 54 transmit information using different home networking power line technologies, logic circuitry 88B converts the received information from the received format into a format compliant with the home networking power line technology used by ONT 28 and outputs the compliant signal with increased signal strength. Modulator 85A modulates the output of logic circuitry 88B to encode information using the appropriate home networking power line technology and coupling circuitry 86 couples the modulated carrier signal to DC power line 34. Because DC power line 34 carries DC power and information, there is no need to provide a dedicated communication cable from ONT 28 to subscriber premises 50, thereby reducing cost as well as installation complexity and time.

Figure 6:
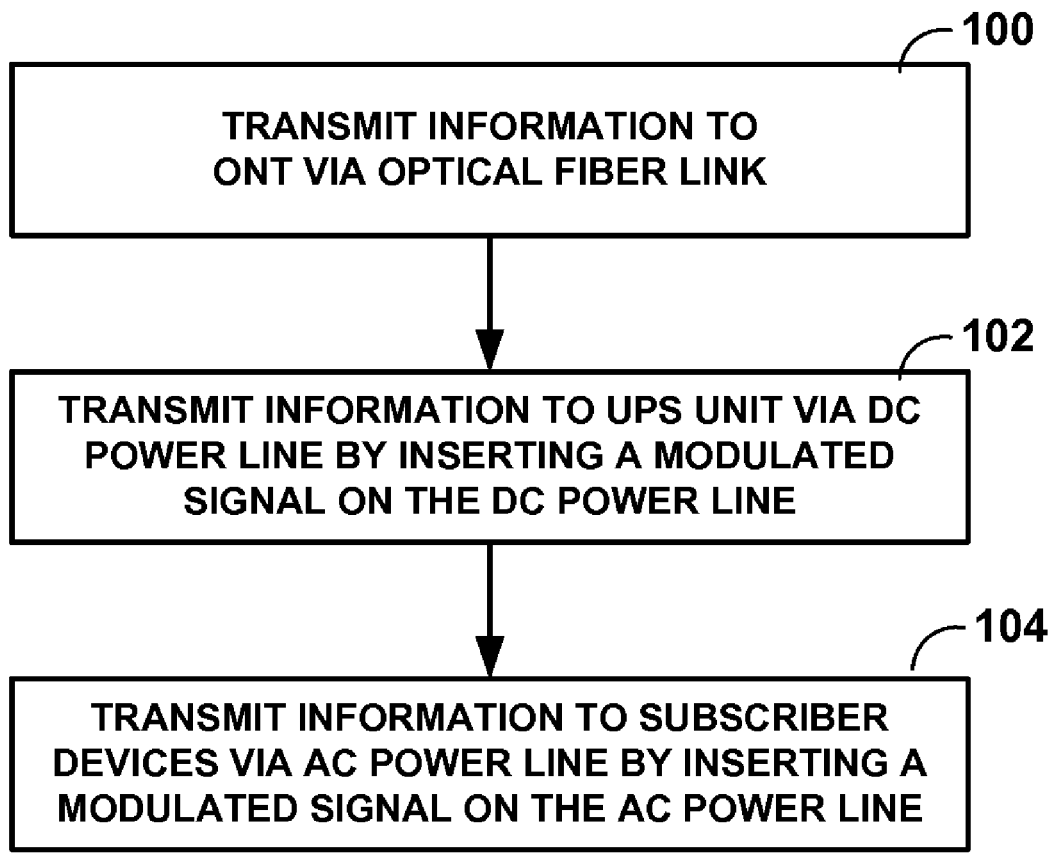
FIG. 6 is a flow diagram illustrating exemplary operation of the PON of FIG. 1 in transmitting information from the PON to subscriber devices.

FIG. 6 is flow diagram illustrating exemplary operation of PON 10 for transmitting information from ONT 28 to subscriber devices 54 within subscriber premises 50. For purposes of illustration, the flow diagram depicted in FIG. 6 is described with reference to the exemplary structure illustrated in FIG. 3. In general, UPS unit 40 supplies ONT 28 with DC power via DC power line 34. During normal operation, UPS unit 40 performs AC-to-DC conversion of line power 72 to supply ONT 28 with DC power. UPS unit 40 includes battery 66 in order to deliver battery power to ONT 28 during a power failure.

Initially, OLT 12 transmits information to ONT 28 in the form of voice, video, and data over optical fiber link 11 (100). ONT 28 transmits the received information to UPS unit 40 via DC power line 34 by inserting a modulated signal DC power line 34 (102). More specifically, ONT 28 inserts the modulated signal on DC power line 34 with a carrier frequency and modulates the signal to convey the information. In general, ONT 28 transmits the information using a BPL technology or a home power line networking technology such as HomePlug BPL, HomePlug AV, Intellon Turbo, or DS2 to generate the modulated signal and using an AC coupling capacitor to couple the modulated signal to DC power line 34.

UPS unit 40 receives the modulated signal and transmits the received information to subscriber devices 54 at subscriber premises 50 via AC power line 44 by inserting a modulated signal on AC power line 44 (104). In particular, UPS unit 40 demodulates the received signal and converts the information into a format suitable for transmission over AC power line 44. When UPS unit 40 transmits the received information using the same protocol or technology used by ONT 28 to transmit the information to UPS unit 40, UPS unit 40 may not process the information or convert the information into a different format. Rather, UPS unit 40 may transmit the information to subscriber devices 54 via AC power 44 by inserting a modulated signal on AC power line 44. However, when UPS unit 40 transmits the received information using a technology different from the technology used by ONT 28 to transmit the information to UPS unit 40, UPS unit 40 may process the received information before transmitting the information to subscriber devices 54.

Figure 7:
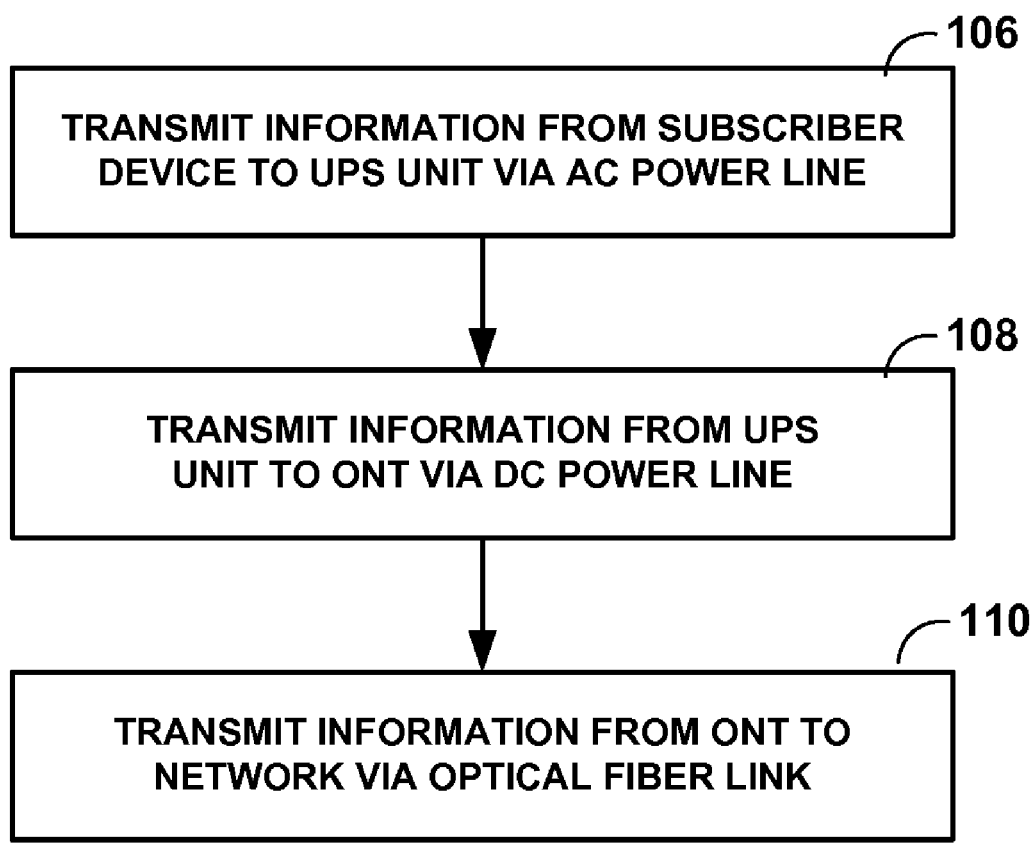
FIG. 7 is a flow diagram illustrating exemplary operation of the PON of FIG. 1 in transmitting information from subscriber devices to the PON.

FIG. 7 is a flow diagram illustrating exemplary operation of the PON of FIG. 1 in transmitting information from one or more subscriber devices to the PON via a UPS unit and ONT. In the example of FIG. 7, information such as voice, video and/or data is transmitted from subscriber devices to the UPS unit via the AC power line (106). The UPS unit then transmits the information received from the subscriber devices to the ONT via the DC power line (108). The ONT then transmits the information received from the UPS unit to the PON via the optical fiber link (110).

The techniques described herein may be implemented in hardware, software, firmware, or any combination thereof. If implemented in software, the techniques may be directed to a computer readable medium comprising program code, that when executed in a processor or processors, performs one or more of the techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor or processors may execute instructions stored in memory in order to carry out one or more of the techniques described herein. In some cases, the techniques may be executed by circuitry that invokes various hardware components to accelerate the techniques. In other cases, the units described herein may be implemented as one or more microprocessors, one or more application specific integrated circuits (ASICs), one or more field programmable gate arrays (FPGAs), or some other hardware-software combination.

Various embodiments of the invention have been described. However, one skilled in the art will appreciate that various embodiments or additions may be made to the described embodiments without departing from the scope of the claimed invention. For example, while the invention is generally described in the context of transmitting information from an ONT to subscriber devices at a subscriber premises within a PON, the invention may be applicable to network interface devices powered by UPS units in other types of networks. These and other embodiments are within the scope of the following claims.

The invention claimed is:

1. A method comprising:
supplying power to a network interface device via a direct current (DC) power line that extends between the network interface device and an uninterruptible power supply (UPS) unit;
supplying power to the UPS unit via an alternating current (AC) power line that extends between a subscriber premises and the UPS unit;
transmitting information to the UPS unit from the network interface device via the DC power line that supplies power to the network interface device and that extends between the network interface device and the UPS unit; and
transmitting the information from the UPS unit to one or more subscriber devices within the subscriber premises via the AC power line that supplies power to the UPS unit and that extends between the subscriber premises and the UPS unit.

2. The method of claim 1, wherein the information comprises at least one of voice, video, and data.

3. The method of claim 1, wherein the network interface device includes an optical network terminal (ONT) in a passive optical network (PON).

4. The method of claim 1, wherein transmitting information to the UPS unit comprises inserting a carrier frequency onto the DC power line and modulating the carrier frequency in accordance with one of a broadband power line (BPL) technology and a home power line networking technology.

5. The method of claim 4, wherein inserting the carrier frequency comprises AC coupling the carrier frequency on the DC power line.

6. The method of claim 1, wherein transmitting information from the UPS unit to the one or more subscriber devices comprises inserting a carrier frequency onto the AC power line and modulating the carrier frequency in accordance with a home power line networking technology.

7. The method of claim 6, wherein inserting the carrier frequency on the AC power line comprises passively coupling the carrier frequency on the AC power line using a resistor-inductor-capacitor (RLC) coupling network.

8. The method of claim 6, wherein inserting the carrier frequency on the AC power line comprises actively coupling the carrier frequency on the AC power line using an active relay agent.

9. The method of claim 1, wherein transmitting the information to the UPS unit comprises transmitting the information using a first home power line networking technology, and wherein transmitting the information to the subscriber devices comprises transmitting the information using a second home power line networking technology different from the first home power line networking technology.

10. The method of claim 1, wherein transmitting the information to the UPS unit comprises transmitting the information using a first home power line networking technology, and wherein transmitting the information to the subscriber devices comprises transmitting the information using the first home power line networking technology.

11. The method of claim 1, wherein the AC power line supplies power from one or more power outlets within the subscriber premises and each subscriber device is electrically connected to one of the power outlets.

12. The method of claim 1, further comprising:
transmitting additional information to the UPS unit from the one or more subscriber devices via the AC power line; and
transmitting the additional information from the UPS unit to the network interface device via the DC power line.

13. A method comprising:
supplying power to a network interface device via a direct current (DC) power line that extends between the network interface device and an uninterruptible power supply (UPS) unit;
supplying power to the UPS unit via an alternating current (AC) power line that extends between a subscriber premises to the UPS unit;
transmitting information to the UPS unit from one or more subscriber devices within the subscriber premises via the AC power line that supplies power to the UPS unit and that extends between the subscriber premises and the UPS unit; and
transmitting the information from the UPS unit to the network interface device via the DC power line that supplies power to the network interface device and that extends between the network interface device and the UPS unit.

14. The method of claim 13, wherein the information comprises at least one of voice, video, and data.

15. The method of claim 13, wherein the network interface device includes an optical network terminal (ONT) in a passive optical network (PON).

16. The method of claim 13, wherein transmitting information to the UPS unit comprises inserting a carrier frequency onto the AC power line and modulating the carrier frequency in accordance with a home power line networking technology.

17. The method of claim 16, wherein inserting the carrier frequency comprises coupling the carrier frequency on the AC power line.

18. The method of claim 13, wherein transmitting information from the UPS unit to the network interface device comprises inserting a carrier frequency onto the DC power line and modulating the carrier frequency in accordance with one of a broadband power line (BPL) technology and a home power line networking technology.

19. The method of claim 18, wherein inserting the carrier frequency on the DC power line comprises at least one of passively coupling the carrier frequency on the DC power line using a resistor-inductor-capacitor (RLC) coupling network, or actively coupling the carrier frequency on the DC power line using an active relay agent.

20. The method of claim 13, wherein transmitting the information to the UPS unit comprises transmitting the information using a first home power line networking technology, and wherein transmitting the information to the network interface device comprises transmitting the information using a second home power line networking technology different from the first home power line networking technology.

21. The method of claim 13, wherein transmitting the information to the UPS unit comprises transmitting the information using a first home power line networking technology, and wherein transmitting the information to the network interface device comprises transmitting the information using the first home power line networking technology.

22. The method of claim 13, wherein the AC power line supplies power from one or more power outlets within the subscriber premises and each subscriber device is electrically connected to one of the power outlets.

23. A method comprising:
supplying power to an optical network terminal (ONT) in a passive optical network (PON) via a direct current (DC) power line that extends between the ONT and an uninterruptible power supply (UPS) unit;
supplying power to the UPS unit via an alternating current (AC) power line that extends between a subscriber premises and the UPS unit;
transmitting information to the UPS unit from the ONT via the DC power line that supplies power to the ONT and that extends between the ONT and the UPS unit; and
transmitting the information from the UPS unit to one or more subscriber devices within the subscriber premises via the AC power line that supplies power to the UPS unit and that extends between the subscriber premises and the UPS unit.

24. The method of claim 23, further comprising:
transmitting additional information to the UPS unit from the one or more subscriber devices via the AC power line; and
transmitting the additional information from the UPS unit to the ONT via the DC power line.

* * * * *